Patented Apr. 12, 1938

2,114,251

UNITED STATES PATENT OFFICE 2,114,251

MANUFACTURE OF COATING PREPARATIONS

Paul Koch, Basel, Switzerland, assignor to J. R. Geigy A. G., Basel, Switzerland No Drawing. Application June 15, 1935, Serial No. 26,868. In Germany June 27, 1934

5 Claims. (Cl. 134—17)

Within recent years solutions of chlorinated rubber containing pigments or other fillers in suitable solvents have acquired an increased importance. As pigments and filling agents there have been used chiefly chromium oxide and iron oxide pigments, titanium oxide, graphite, silicon carbide, asbestos powder and others. Without these additions it has not hitherto been possible to produce useful protective coatings by means of chlorinated rubber.

In order to produce a highly resistant filled coating the use of a chlorinated rubber of high stability is indispensable; nevertheless, even such protective layers are associated with disadvantages which hinder their application on a broader basis. The adherence of such coatings is to a large extent dependent on the nature and physical character of the support. For instance in producing a protective coating on iron it is necessary first to free it thoroughly from rust and then to apply a coating of a customary oil redlead varnish and only after this coating has thoroughly dried is the article coated with one or more layers of filled chlorinated rubber. This procedure is open to various objections and involves various difficulties.

According to this invention such difficulties can be overcome by incorporating elementary sulphur in a chlorinated rubber lacquer of the usual composition. Sulphur has hitherto been used in the rubber industry for the production of vulcanized products which have new and valuable properties as compared with the parent material. In contrast thereto chlorinated rubber derivatives do not undergo vulcanization. In a solution of chlorinated rubber sulphur plays quite a different part from that which it plays in the vulcanization of rubber. It is added at ordinary temperature and no after-treatment of physical or chemical nature is required.

Coatings prepared by means of compositions in accordance with the present invention have an improved resistance and power of adhesion. The stability of the chlorinated rubber itself now becomes of subordinate importance. Even products which, without the addition of sulphur, split off hydrogen chloride when subjected to the usual tests yield unobjectionable results when used in accordance with the invention. The compositions offer also the great advantage over the hitherto known chlorinated rubber compositions that they can be applied to iron surfaces without any preparation or pre-treatment of the surface. Rusted iron can be coated directly without difficulty; the film produced adheres very well and the corrosion, which has already commenced, does not progress further. The compositions thus offer the important advantage that the coating is independent of any preparation of the surface.

The resistance of the coatings towards strong chemical, mechanical and atmospheric influences is increased by the presence of the sulphur.

Chlorinated rubber film coatings prepared with the compositions are not attacked by sulphuric and acetic acid of 80 per cent strength, nitric acid of 50 per cent strength, concentrated hydrochloric acid, sulphurous acid or caustic alkalies of any concentration, oils, benzine, salt solutions, hypochlorite solutions and reactive gases. Pigments, such as zinc oxide or calcium carbonate, which, owing to their solubility in acid, cannot be used as fillers in the customary acid-resistant chlorinated rubber lacquers are rendered quite fast to acid by the addition of sulphur. The pigment which is normally sensitive to acid is protected so remarkably that the attack of the acid, which, in the case of a film free from sulphur spreads progressively throughout the film, is restricted to the surface. The addition of sulphur does not alter the other known advantageous properties of chlorinated rubber films, not here further referred to. Also the electrical insulating power of the films is quite appreciably increased.

Any of the usual commercial forms of sulphur may be used. It is of no consequence whether the sulphur is comminuted before addition to the lacquer or in presence of the lacquer. It may also be introduced into the lacquer in solution in a suitable solvent so that it precipitates only in the lacquer mixture. Its physical degree of subdivision may be selected as desired. The proportion which is to be added depends on the purpose for which the lacquer is to be used and may be increased without difficulty up to as much as 40 parts per 100 parts of lacquer mixture.

In the following examples, given in illustration of the invention, there is used as the basis of the lacquers a solution of chlorinated rubber containing, on an average, 25 per cent of chlorinated rubber of usual commercial quality (the choice of the particular material being governed by the viscosity desired of the lacquer) and 75 per cent of solvent. As solvent there may be used chlorobenzene or any other customary solvent, such as toluene, xylene, tetra-hydronaphthalene, deca-hydronaphthalene, cyclohexanol, an aliphatic chlorinated hydrocarbon, an ester and so on, or mixtures of any of these. The following quantitative data are given in illustration of the composition of mixtures suitable for various purposes but they do not exhaust the many possibilities offered by the wide applicability of chlorinated rubber lacquers in the lacquer and paint industry. So also the proportions of the individual constituents may vary within wide limits according to the particular application contemplated for the lacquer. The parts in the examples are by weight:—

Example 1

40 parts of flowers of sulphur are incorporated in a homogenizing apparatus in 100 parts of a chlorinated rubber solution containing 25 parts of chlorinated rubber powder having a chlorine content of 56 per cent and 75 parts of chlorobenzene and there are finally added 5 parts of a softener such as the methylcyclohexanol ester of methyladipic acid. By coating a surface with the mixture thus prepared there is obtained a film which is resistant towards alkalies, acids, oils, salts, gasoline and the like and has good adhesion to metals.

Example 2

25 parts of chlorinated rubber powder having a chlorine content of about 60 per cent are mixed in a homogenizing apparatus with 35 parts of finely ground sulphur, 7 parts of Helio Red RL (Color Index No. 69) and 8 parts of a softener and the mixture is worked up into a coating composition by the addition of 75 parts of a solvent consisting of equal parts of xylene and toluene. The composition thus prepared yields red films having the properties hereinbefore described.

Example 3

25 parts of chlorinated rubber powder having a chlorine content of 56 per cent are dissolved in 75 parts of a solvent mixture consisting of equal parts of chlorobenzene and xylene. After dissolution there are added 30 parts of finely ground sulphur, 20 parts of titanium white and 10 parts of a softener and the whole is mixed in a suitable mixing apparatus until homogeneous. The composition thus prepared yields white films having the properties hereinbefore referred to. Instead of titanium white there may be used lithopone or zinc white.

Example 4

25 parts of a chlorinated rubber powder having a chlorine content of 60 per cent are dissolved in 25 parts of a solvent mixture consisting of equal parts of chlorobenzene and tetra-hydronaphthalene. To the highly viscous mass thus obtained are added 30 parts of powdered sulphur, 10 parts of carbon black and 8 parts of a softener and the whole is mixed in a suitable mixing apparatus to a homogeneous paste. There are then added further 50 parts of the above solvent mixture; before use the composition is brought, by further dilution, to a consistency suitable for application by brushing.

Example 5

30 parts of powdered sulphur and 10 parts of gas black or graphite are ground as finely as possible in a suitable mixing apparatus. 100 parts of a chlorinated rubber solution containing 25 parts of chlorinated rubber having a chlorine content of 56 per cent and 75 parts of a solvent mixture consisting of 50 parts of chlorobenzene, 15 parts of toluene and 10 parts of gasoline are then added and the whole mixed in a homogenizing apparatus. The composition so obtained may be applied by brushing or spraying and yields grey films of excellent resistance towards the agencies hereinbefore referred to.

Example 6

5 parts of a synthetic artificial resin (substitute for natural copal) are dissolved in 5 parts of linseed oil, wood stand oil or wood thick oil or a mixture thereof, if necessary with the addition of turpentine.

To this solution there are then added 35 parts of finely ground sulphur, 5 parts of Lithol Red (Color Index No. 189), 5 parts of a softener and lastly 100 parts of a chlorinated rubber solution as described in Example 1. The mixture is then worked up in a suitable mixing apparatus to a homogeneous paint ready for application by brushing. A coating prepared with this composition has, in comparison with an ordinary oil coating, very good properties in respect to its resistance towards acids and salts, although it is attacked to a certain extent by alkalies.

Example 7

2 parts of powdered sulphur are dissolved in a chlorinated rubber solution consisting of 25 parts of chlorinated rubber powder having the chlorine content of 56 per cent and 75 parts of orthodichlorobenzene. The chlorinated rubber solution, saturated with dissolved sulphur thus obtained, yields coatings having a higher resistance towards various reagents than a transparent chlorinated rubber film containing no filler.

What I claim is:—

1. A coating composition of the character described comprising a solution of chlorinated rubber in an organic solvent and an inert filler comprising essentially sulphur in free state therein.

2. A coating composition of the character described comprising, a solution of chlorinated rubber in an average proportion of 25 per cent in an organic solvent and of 8 to 160 per cent of an inert filler comprising essentially sulphur in free state therein, calculated on the quantity of chlorinated rubber.

3. A coating composition, consisting of a solution of chlorinated rubber in a mixture of xylene and toluene, and of an inert filler comprising essentially sulphur in free state, a color pigment and a softener therein.

4. A coating composition, consisting of a solution of chlorinated rubber in a mixture of chlorobenzene and tetrahydronaphthalene, and of an inert filler comprising essentially sulphur in free state, carbon black and a softener therein.

5. A coating composition, consisting of a solution of chlorinated rubber in chlorobenzene, and of synthetic artificial resin, an inert filler comprising essentially sulphur in free state, a color pigment and a softener therein.

PAUL KOCH.